(12) United States Patent
Lennevi et al.

(10) Patent No.: US 11,214,208 B2
(45) Date of Patent: Jan. 4, 2022

(54) TRACTION VOLTAGE SYSTEM IN A VEHICLE AND METHOD FOR CONTROLLING SUCH A SYSTEM

(71) Applicant: VOLVO TRUCK CORPORATION, Gothenburg (SE)

(72) Inventors: Jerker Lennevi, Lerum (SE); Tobias Smidebrant, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 5 days.

(21) Appl. No.: 15/038,665

(22) PCT Filed: Nov. 28, 2013

(86) PCT No.: PCT/EP2013/003591
§ 371 (c)(1),
(2) Date: May 23, 2016

(87) PCT Pub. No.: WO2015/078481
PCT Pub. Date: Jun. 4, 2015

(65) Prior Publication Data
US 2016/0304041 A1    Oct. 20, 2016

(51) Int. Cl.
*B60R 16/03*    (2006.01)
*B60L 1/00*    (2006.01)
(Continued)

(52) U.S. Cl.
CPC ............... *B60R 16/03* (2013.01); *B60L 1/00* (2013.01); *B60L 50/10* (2019.02); *H02J 1/14* (2013.01);
(Continued)

(58) Field of Classification Search
CPC ..... B60R 16/03; Y10T 307/31; Y10T 307/406
(Continued)

(56) References Cited

U.S. PATENT DOCUMENTS 5,521,788 A * 5/1996 Miyazaki ............... B60L 1/00
307/82
5,581,433 A * 12/1996 Jordan ............... H02H 3/025
361/58

(Continued)

OTHER PUBLICATIONS

Internationa Search Report (dated Aug. 19, 2014) for corresponding International App. PCT/EP2013/003591.
(Continued)

*Primary Examiner* — Adi Amrany
(74) *Attorney, Agent, or Firm* — WRB-IP LLP

(57) ABSTRACT

A traction voltage system in a vehicle includes a junction box with multiple connectors for electrical components, which components include electrical supplies and electrical loads, and an electronic control unit arranged to monitor current flowing flow to or from the components. A controller or a circuit breaker is arranged to control the supply of power to each respective component, and at least all but one of the connectors are provided with a current sensor arranged to transmit a signal representing detected current values to the electronic control unit. The electronic control unit is arranged to determine an instantaneous current value flowing to or from each component, to compare the instantaneous current value with a predetermined limit value for each connector, and to take action in response to the comparison. A method for controlling the traction voltage system is also provided.

21 Claims, 3 Drawing Sheets

(51) Int. Cl.
  *H02J 13/00* (2006.01)
  *H02J 1/14* (2006.01)
  *B60L 50/10* (2019.01)
(52) U.S. Cl.
  CPC ........... *H02J 13/0003* (2013.01); *Y02T 10/70* (2013.01); *Y02T 10/7072* (2013.01)
(58) Field of Classification Search
  USPC ............................ 307/9.1, 131, 13.1, 31.131
  See application file for complete search history.

(56) References Cited

U.S. PATENT DOCUMENTS

| | | | | |
|---|---|---|---|---|
| 5,943,203 | A * | 8/1999 | Wang | H02H 9/001 361/103 |
| 6,600,641 | B2 * | 7/2003 | Oglesbee | G05F 1/565 361/103 |
| 7,230,813 | B1 * | 6/2007 | Canova | H02H 3/025 361/93.1 |
| 7,630,185 | B2 * | 12/2009 | Fiesoli | H02H 3/087 361/93.1 |
| 2004/0136125 | A1 * | 7/2004 | Nemir | H02H 1/0015 361/42 |
| 2005/0078024 | A1 * | 4/2005 | Harrington | H02J 1/08 341/155 |
| 2005/0162795 | A1 | 7/2005 | Leiber | |
| 2007/0168088 | A1 * | 7/2007 | Ewing | H02J 3/14 700/295 |
| 2007/0241614 | A1 * | 10/2007 | Busdiecker | H02J 1/14 307/10.1 |
| 2012/0022813 | A1 * | 1/2012 | Van Riet | G01R 22/10 702/62 |
| 2012/0245794 | A1 * | 9/2012 | Aragai | H02J 1/14 701/36 |
| 2013/0066519 | A1 | 3/2013 | Yoshikawa et al. | |
| 2014/0268461 | A1 * | 9/2014 | Jeong | H02H 3/08 361/87 |
| 2015/0008674 | A1 * | 1/2015 | Hatanaka | B60L 11/16 290/45 |
| 2015/0021996 | A1 * | 1/2015 | Augesky | G05F 1/577 307/31 |
| 2015/0202978 | A1 * | 7/2015 | Hatanaka | B60L 1/00 701/19 |
| 2015/0343906 | A1 * | 12/2015 | Hatanaka | B60L 9/16 307/9.1 |

OTHER PUBLICATIONS

International Preliminary Report on Patentability (dated Nov. 5, 2015) for corresponding International App. PCT/EP2013/003591.

* cited by examiner

TRACTION VOLTAGE SYSTEM IN A VEHICLE AND METHOD FOR CONTROLLING SUCH A SYSTEM

BACKGROUND AND SUMMARY

The invention relates to a vehicle Traction voltage system comprising a junction box with multiple connectors for electrical components, which components comprise electrical supply means and electrical loads, and a method for controlling such a traction voltage system.

Modern electric and hybrid electric vehicles often comprise relatively complex electrical power management systems. Communication between different systems can be achieved by high speed serial bus communication techniques. An example of a commonly used serial bus protocol used in vehicle systems is the CAN (Controller Area Network) protocol. The CAN protocol is a multi-master protocol for efficiently communicating serial data between a vehicle's systems and subsystems.

The efficiency of hybrid vehicles is partly dependent on the monitoring and control of the electrical power consumed or generated by different vehicle systems and subsystems. Sometimes it can be useful to assign priorities to different systems or subsystems, wherein a higher priority system is supplied with power while the power to a lower priority system can be at least partially reduced during periods of high load. An example of such an arrangement is described in US2007/241614. In this arrangement, a motor controller is connected to a battery while electrical accessories are connected to the battery via a junction box. The junction box contains one or more fuses sized to protect the electrical conductors servicing the accessories along an accessory power bus.

One problem with the solution described in US2007/241614 is that it is mainly directed at a system for monitoring electrical loads connected to the junction box. Faults occurring in other loads or in electrical supply systems may not be detected and can cause overloading of the system. A further problem is that fleet owners or coach builders may remove, replace or add extra electrical equipment to a vehicle. For instance, when a new accessory is connected to the junction box, the added electrical load may not be detected by the monitoring system if the accessory uses a different communications protocol or is incorrectly installed.

It is desirable to provide an improved arrangement and method for controlling a traction voltage system in a vehicle that solves the above problems.

In the subsequent text, the term "electronic control unit" or ECU is intended to describe a central control unit, preferably arranged in or near a junction box, which electronic control unit can be used for managing the junction box and all components connected to the junction box. The term "controller" is intended to describe a control unit used for managing an individual component. Depending on the type of component, the controller can be used in combination with a circuit breaker where appropriate.

As indicated above, communication between different vehicle systems and subsystems can be implemented using high speed serial bus communication techniques, such as the CAN (Controller Area Network) protocol. The CAN protocol is a multi-master protocol for efficiently communicating serial data between a vehicle's systems and subsystems. Other vehicle bus communication protocols are known by names such as LIN, MOST, and FLEXRAY. The protocol used for communication between vehicle systems is not part of the invention per se and will not be described in further detail.

According to a preferred embodiment, an aspect of the invention relates to a traction voltage system in a vehicle, which system comprises a junction box with multiple connectors for electrical components, which components comprise at least one electrical supply means and at least one electrical load, and an electronic control unit arranged to monitor current flowing flow to or from the components. The vehicle is preferably a commercial vehicle or a work vehicle. The junction box comprises a protective housing with electrical connectors and contains electrical conduits for directing electrical power between the electrical supply means and the electrical loads. The junction box is a "controlled environment" that can be operated separate from the components connected to it by means of the central electronic control unit.

According to one example, the electrical supply means comprise at least one power electronics converter (PEC), at least one high voltage energy storage, a DC/DC converter, a charger for the energy storage, and at least one auxiliary load. The power electronics converter, or PEC, is sometimes referred to as an electronic motor drive unit, or EMD unit. The PEC is connected between the junction box and a traction motor, which motor can comprise an electrical DC or AC motor for driving the vehicle. The traction motor can comprise a motor-generator for driving the vehicle or for regenerating energy to the energy storage. Alternatively, the driveline can comprise a traction motor for driving the vehicle and a separate generator regenerating energy to the energy storage, where both the motor and the generator are connected to the PEC. The PEC is provided with an AC/DC converter (inverter) if an AC-motor is used or with a DC/DC converter if a DC-motor is used. Consequently, the PEC can be considered as being an electrical supply means and/or an electrical load, depending on the layout of the vehicle driveline and the current operating state.

A high voltage energy storage can comprise a DC traction battery, which is connected to the junction box via a positive and negative pole. Depending on the power requirement of the vehicle, the battery can supply a predetermined voltage to the traction voltage system via the junction box. DC traction batteries can have a voltage selected in the range 300 to 800 V, but the voltage of the energy storage is not relevant to the principle of the invention per se. During regeneration the motor-generator or a separate generator can charge the battery via a DC/DC converter in the power electronics converter and the junction box.

The junction box can also be provided with a connector for a charger for the energy storage. The charger comprises an AC/DC converter that draws power from the grid and can be plugged into a connector in the junction box when the vehicle is stationary.

Alternative electrical supply means can comprise a high voltage power-collecting system and a DC/DC power converter connected to the junction box. The power-collecting system draws power from overhead wires or roadside rails that usually supplies DC power, as AC systems are more complex and expensive. Such DC systems are commonly used by trolley buses and trams. The power-collecting system can also be used for charging the energy storage, both when the vehicle is moving and when it is stationary. Electrical supply means in the form of fuel cells and super-capacitors are also contemplated within the scope of the invention.

An example of an electrical load is, for instance, a DC/DC converter connected to the junction box for supplying power to a low voltage circuit. Typical voltages for a low voltage circuit are, for instance 12, 24 or 42 Volts. The junction box can be provided with connectors for a number of additional loads, where the number of connectors can vary with the desired specification for a vehicle intended for a particular use. A non-limiting list of examples of electrical load that can be connected to the junction box are an electrically driven air conditioning (AC) system, including compressors and fans, as charger for a low voltage battery, air compressors for pneumatic consumers (wheel suspension, doors, etc.), electrically operated pumps and/or fans for the engine cooling system, hydraulic power takeoff (PTO) devices such as hydraulics for lifting and compacting (for refuse vehicles) or ramps and wheelchair lifts (for buses).

A controller or a circuit breaker is arranged to control the supply of power to each respective component. For instance, DC components requiring a controlled shut down to avoid arcing and damage to relays and electronic components will require both a controller and a circuit breaker. A high voltage energy storage is one example of such a component, where the traction battery comprises a battery management unit (BMU) and a circuit breaker. For other components, such as some auxiliary loads, a controller or a circuit breaker can be sufficient for powering down or switching off the component.

All or all but one of the connectors are provided with a current sensor arranged to transmit a signal representing detected current values to the electronic control unit. Examples of suitable DC current sensors for this purpose are Hall effect sensors, fiber optic current sensors, or similar non-contact sensors. The sensors should have an accuracy of +/−0.5% or better.

As indicated above, all or all but one of the connectors associated with the junction box are provided with a current sensor arranged to transmit a signal representing detected current values to the electronic control unit. According to one example, all connectors connected to power supplying means and electrical loads provided in the vehicle in an initial state, e.g. as supplied by the manufacturer of the vehicle, can each be provided with a current sensor. Subsequently, a coach builder, fleet owner or an independent operator can connect a power supplying means or electrical load to the junction box using a connector not provided with a current sensor. The added component can then be monitored by the electronic control unit using input signals from the available current sensors on the other connectors. These input signals allow the electronic control unit to calculate the current flow to or from the added component. For the alternative where all connectors are provided with a sensor, the system provides a certain sensor redundancy. If one sensor should malfunction, then the electronic control unit can still calculate the current flowing to or from all components using the input signals from the current sensors on the other connectors.

The electronic control unit is arranged to monitor the flow of current through the junction box and to determine instantaneous values for the current flowing to or from each component. For instance, current can flow from an electrical supply means, such as an energy storage, to an electrical load, such as a power electronics component or PEC, during operation of an electric motor or motor/generator to drive the vehicle. During regeneration, current generated by a generator or motor/generator can flow in the reverse direction, from the PEC to the energy storage. Also, current will flow from the energy storage to one or more electrical loads during operation of the loads, and to the energy storage from a charger during charging of the energy storage. The electronic control unit can monitor current flowing flow to or from each component using the current sensors. When an added electrical consumer lacking a sensor is added to the system, then the electronic control unit can calculate the current flowing flow to or from the added electrical consumer using the input from the available current sensors.

The electronic control unit is arranged to compare detected instantaneous current values with a predetermined limit value for each connector. The limit value can be a maximum current value, a maximum rate of change for a current value or a number of current pulses or cyclic current variations detected over a predetermined time. Depending on the outcome of the comparison between instantaneous current values and predetermined limit values, the electronic control unit is arranged to respond by controlling the controller or the circuit breaker of the components.

According to a first example, the electronic control unit is arranged to at least limit the current to or from a component if the instantaneous current through a connector exceeds a predetermined limit for power usage for that connector. This can be achieved by means of the controller associated with the component using excessive power, wherein the current supplied to the component is reduced at least to an allowable level to ensure stable operation of the junction box. The allowable level can be dependent on the predetermined limit for the connector used by the component or on a minimum power requirement for the component. In this way a component that is required for the operation of the vehicle can continue to operate at least under reduced power. Each of the multiple connectors associated with the junction box has a maximum value for power usage that should not be exceeded to avoid damage to the connector or the junction box. Hence, when adding or replacing an electrical consumer, or accessory, an operator should use a connector with an available power output adapted to the electrical load required by the electrical consumer.

According to a second example, the electronic control unit is arranged to interrupt the current to or from a component if the instantaneous current through a connector exceeds a predetermined limit for power usage for that connector. In this way, a component that is not required for the operation of the vehicle can be disconnected to ensure stable operation of the junction box. Also, a power surge caused by a malfunctioning component can be detected by a controller for the component or by the electronic control unit, wherein the component is switched off.

According to a third example, the electronic control unit is arranged to at least limit the current to or from a component if the instantaneous current through a connector exceeds a first predetermined limit for power usage for that connector, or to interrupt the current if the instantaneous current exceeds a second predetermined limit. In this way, the power to a component can be reduced or interrupted in a controlled manner when it is detected that the power usage increases above an allowable limit.

According to a fourth example, the electronic control unit is arranged to at least the current to or from a component if the instantaneous current through a connector exceeds a number of cyclic current variations detected over a predetermined period of time. For instance, if the generator is operated to charge the energy storage too frequently, then this could lead to overheating of the generator or to energy storage related problems. In this case the predetermined limit value is the number of detected charging cycles over a set time period. The cyclic current variations and the direction of the current in the DC bus connecting the PEC and the junction box are detected by a current sensor monitoring the connector for the PEC. The electronic control unit can determine if a limit value for the number of cycles of charging current over a predetermined period of time is being exceeded. The electronic control unit will then cause the supply of charging current from the generator to the energy storage to be either limited or interrupted. This feature can be used for monitoring or detecting irregularities in the operation of a component or the occurrence unexpected events, where the maximum power usage for a connector is not necessarily exceeded.

According to a fifth example, the electronic control unit is arranged to at least limit the current to or from one or more components if the rate of change for the current through a connector exceeds a predetermined value. The predetermined value for the rate of change of the current can be either positive, indicating a sudden increase in the detected current, or negative, indicating a sudden drop in the detected current.

For instance, if the temperature of the energy storage increases rapidly then it is desirable to reduce the current from the energy storage to avoid damage to the system. In such cases, the rate of change of the current through the connector for the energy storage is a preferred indicator, as the allowable current can vary dynamically. A reduction of the current from the energy storage is achieved by reducing the current supplied to one or more electrical loads. The electronic control unit can select one or more loads to be reduced, depending on the current vehicle operating conditions.

Alternatively, if a sudden drop in accepted charging current occurs during regeneration of the energy storage it is desirable to reduce the current to the energy storage to avoid damage to the system. In this case, the rate of change of the current through the connector for the energy storage exceeds a predetermined negative value, indicating a sudden drop in the accepted charge current. A reduction of the current supplied to the energy storage is achieved by increasing the current supplied to one or more electrical loads. The electronic control unit can select one or more loads to be increased, such as brake resistors or an electrical AC unit, depending on the current vehicle operating conditions.

The electronic control unit can be arranged to log current values in excess of the predetermined value if the current through a connector exceeds a predetermined value for power usage for that connector. In addition, or alternatively, the electronic control unit can be arranged to generate a warning signal if the current through a connector exceeds a predetermined value for power usage for that connector. The warning signal can be transmitted to an operator as an audible, visual and/or tactile signal. In this way it is possible to detect and monitor a component that uses too much power. When such a condition is detected, damage to the traction voltage system can be prevented by issuing a warning to the operator and/or by interrupting or reducing the supply of power to the component. Excessive use of power can be logged to indicate that the system has been abused, for instance by the incorrect installation of a component, or that a component with a too high power rating and/or which has not verified by the manufacturer of the vehicle has been installed.

The electronic control unit can also be arranged to determine that a particular component is switched of before a circuit breaker connecting the component to the junction box is opened. Alternatively, the electronic control unit is arranged to determine that each component connected to the junction box is switched off before all circuit breakers connecting the components to the junction box are opened. These features can be used for performing a controlled interruption of power, as DC components can be destroyed if current is interrupted incorrectly. They can also be used to ensure that a particular component is switched of before it is disconnected, serviced or replaced, or that no current is flowing through the junction box when service or repair is carried out.

The invention further relates, according to an aspect thereof, to a vehicle provided with a traction voltage system comprising a junction box as described above.

The invention also relates, according to an aspect thereof, to a method for monitoring current flow through a junction box in a vehicle traction voltage system. The junction box has multiple connectors for electrical components, which components comprise at least one electrical supply means, at least one electrical load and a controller or a circuit breaker associated with each component. The current flow to or from the components is monitored by an electronic control unit. The method involves the steps of;

detecting the current flowing to or from at least all but one of the components by means of sensors;

transmitting signals representing detected current values to the electronic control unit;

determining an instantaneous current flowing to or from each component;

comparing instantaneous current values with a predetermined limit value for each connector; and controlling the controllers or the circuit breakers of the components in response to the comparison.

According to one example, the method involves limiting the current to or from a component if the instantaneous current through a connector exceeds a predetermined limit for the connector. According to an alternative example, the method involves interrupting the current to or from a component if the instantaneous current through a connector exceeds a predetermined limit for the connector. According to a further alternative example, the method involves limiting the current to or from a component if the instantaneous current through a connector exceeds a first predetermined limit for power usage for that connector, or interrupting the current to or from a component if the instantaneous current through a connector exceeds a second predetermined limit.

According to a further example, the method can also involve at least limiting or interrupting the current to or from a component if the instantaneous current through a connector exceeds a number of cyclic current variations detected over a predetermined period of time. In this case, the instantaneous current values need not necessarily exceed a limit for the connector.

According to a further example, the method can also involve at least limiting the current to or from a power supply component if the rate of change current variations detected over a predetermined period of time exceeds a predetermined limit value. In this case, the rate of change of detected current can exceed either a predetermined positive value or a predetermined minimum value.

The method can also be used for logging current values in excess of the predetermined value if the current through a connector exceeds a predetermined value for the connector. Alternatively, or in addition, the method can also involve the issuing of a warning if the current through a connector exceeds a predetermined value for the connector.

The method can also involve limiting the current to or from a component if the instantaneous current through a connector exceeds a predetermined limit for the component.

Further, the method can involve interrupting the current to or from a component if the instantaneous current through a connector exceeds to predetermined limit for the component. This feature can be used when the electronic control unit has stored or received data for the power rating of a component, in addition to data for the connector. If the power rating for the component is lower than that of the connector, then it can be necessary to limit the current to the component before the maximum allowable power usage for the connector has been reached.

The method can also be used for determining that a particular component is switched off before opening a circuit breaker connecting the component to the junction box, or that all components are switched off before opening all circuit breakers connecting components to the junction box. As described above, these features are used for performing a controlled interruption of power, and/or to ensure that a particular component is switched off before it is disconnected, serviced or replaced.

The present invention also relates to a computer program, computer program product and a storage medium for a computer all to be used with a computer for executing the method as described above.

According to one example, an aspect of the invention relates to a computer program comprising program code means for performing any one of the above method steps, when said program is run on a computer.

According to an alternative example, an aspect of the invention relates to a computer program product comprising program code means stored on a computer readable medium for performing any one of the above method steps, when said program product is run on a computer.

According to a further alternative example, an aspect of the invention relates to a storage medium, such as a computer memory or a non-volatile data storage medium, for use in a computing environment, the memory comprising a computer readable program code to perform any one of the above method steps.

The invention as described above, according to an aspect thereof, involves a number of advantages. First, an aspect of the invention provides the ability to control loads connected to a junction box using the current sensors. The junction box is a "controlled environment" that can be operated separate from the components connected to it by means of the central electronic control unit. The junction box is provided with multiple connectors/sockets, each, or all but one, provided with a separate current sensor and having a predefined maximum power/current output. A user needs only to know the power requirements or power rating for the component to be connected, in order to select an appropriate connector/socket for that component. This ensures that the user does not connect a component that could overload the system. The advantage would be to allow individual components to be monitored and to provide a modular system flowing components to be replaced while maintaining control over the current flow in the system.

Second, an aspect of the invention provides the ability to make accurate load estimations for multiple loads connected to a junction box. Coach builders may make alterations or add extra equipment to a vehicle. When a new load is connected to the junction box, then the connector used provides a predetermined limit for power usage for that connector. When a component uses too much power, this can be prevented by limiting and/or interrupting the supply of power. In addition, when a component uses too much power, this can be prevented and/or monitored by issuing a warning to the operator and/or by logging excessive power usage to indicate that the system has been abused.

Third, an aspect of the invention provides the ability to ensure that all loads are switched off before a circuit breaker connecting a component to the junction box is opened. This is important in DC systems, where components can be destroyed if current is interrupted incorrectly. It can also be used to ensure that a component or the junction box is disconnected during service or replacement of components.

Fourth, an aspect of the invention provides the ability to monitor all loads connected to the system at a central location and issue warnings or log events when irregularities or unexpected events occur. For instance, if a generator is operated to charge the battery too frequently, then this could lead to overheating of the generator or to battery related problems.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
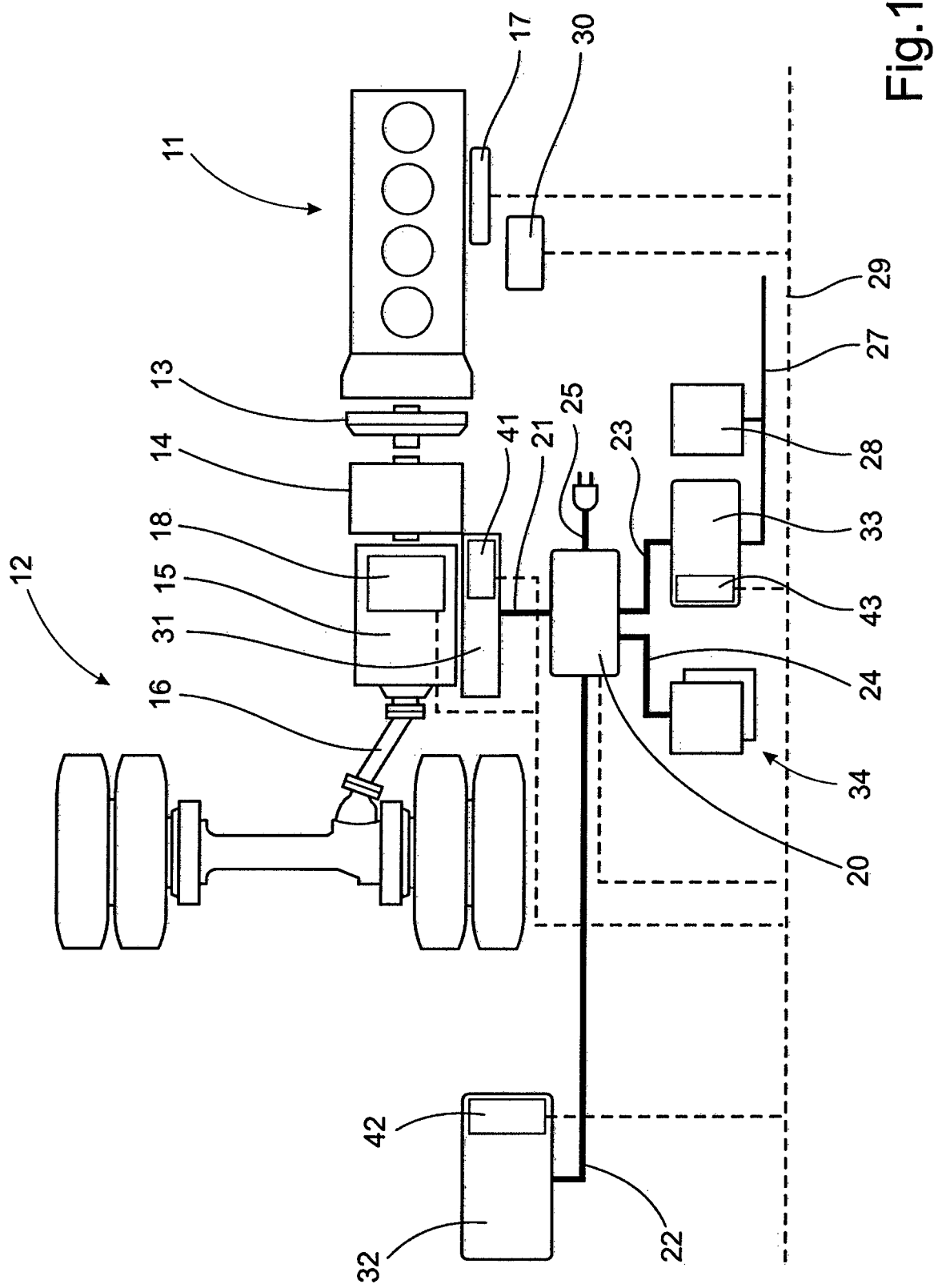
FIG. 1 shows a schematically indicated vehicle with a traction voltage system according to the invention.

FIG. 1 shows a schematically indicated hybrid vehicle 10 comprising a combustion engine 11 that is mechanically coupled to a set of drive wheels 12 through a clutch 13, an electric machine such as an electric motor/generator 14, a gearbox 15 and a transmission shaft 16. The electric motor/generator 14 is connected to a power electronics converter (PEC) 31, which in turn is connected to a high voltage battery pack 32 via a high voltage junction box 20. The electric machine 14 is a motor/generator selectively operable in generating and motoring modes, and is mechanically coupled to the engine 11, either directly, as shown in FIG. 1, or by way of a suitable transmission, such as a drive belt. The traction voltage system comprises a number of high voltage DC buses 21, 22, 23, 24, 25 connected to the high voltage junction box 20 by connectors (see FIG. 2) for. In the subsequent text, the numerals 21, 22, 23, 24, 25 all refer to different DC buses making up an operative high voltage bus. In the example shown in FIG. 1, the high voltage junction box 20, also termed hybrid junction box, is used for joining and distributing high voltage buses to a number of different electrical components.

A first DC bus 21 connects the high voltage junction box 20 to the power electronics converter (PEC) 31 and ultimately to the electric motor/generator 14. The first DC bus 21 is also referred to as a high voltage traction bus. The power electronics converter (PEC) 31 comprises power electronics for controlling the electric motor/generator 14, including a first controller 41, or motor control unit (MCU), and an inverter (not shown). Similarly, the combustion engine 11 is controlled by an electronic engine control unit (EECU) 17 and the gearbox 15 is controlled by a transmission electronic control unit (TECU) 18. In this example, the electric motor/generator 14 is an AC-motor supplied by the inverter. However, it is also possible to use a DC-motor within the scope of the invention.

A second DC bus 22 connects the junction box 20 to the high voltage battery pack 32. The high voltage battery pack 32 is provided with a second controller 42, or battery management unit (BMU), comprising a power connector and electronics (not shown) for controlling the battery pack 32 and the cells making up the battery pack 32. The power connector can comprise a fuse in parallel with a controlled element or contactor such as a relay, or a fuse in series with a relay. According to one example, the power connector can comprise a pre-charge circuit having a pre-charge module for controlling power to a load. The pre-charge module can be of a solid state type and configured as a solid state module in series with a pre-charge resistor, for example a 10 ohm pre-charge resistor and that are together connected across the contacts of a contactor or relay. The relay is a main relay or main contactor for switching power on and off to the load. In this example the load is an inverter arranged in the PEC 31. The power that is switched on and off by the relay is the electric power front the high voltage battery pack 32. The on/off state of the relay is controlled by the BMU 42.

A third DC bus 23 connects the junction box 20 to a DC/DC converter 33 and a low voltage DC bus 27. The operation of the DC/DC converter 23 and the power supply to the low voltage DC bus 27 is controlled by a third controller 43, or DC/DC Control Unit (DCU).

A fourth DC bus 24 connects the junction box 20 to one or more high voltage electrical loads, or electric Power Take-Off loads (ePTO:s) 34. In FIG. 1 show one bus 24 only. In practice, one DC bus can supply multiple loads and/or several DC buses can supply individual loads.

The low voltage DC bus 27 is connected to various 12- or 24-Volt loads (not shown) and an auxiliary 12- or 24-Volt storage battery 28. The low voltage DC bus 27 is also connected to the high voltage bus 24 via the DC/DC converter 33 for maintaining the bus voltage and temporarily supplying power to high voltage electrical loads (ePTO) 34, such as a steering servo or an air conditioning unit of the vehicle, via the junction box 20 in the event of a system failure.

A fifth DC bus 25 connects the junction box 20 to a battery charger 35 connected to the grid. The battery charger 35 is arranged to charge the high voltage battery pack 32 from the grid and is connected to the high voltage junction box 20 via a fifth DC bus 25 and a socket 37. A DC converter and a control unit for the charger are arranged in or adjacent the charger, separate from the junction box.

The junction box 20 and each control unit 17, 18, 41, 42, 43 is also connected to a wire harness 29 in order to communicate with a central electronic control unit 30, or Hybrid Power-train Control Unit (HPCU) via, for instance, a CAN bus. The wire harness 29 is connected to the central electronic control unit 30 and is used for transmitting/receiving control and/or sensor signals to/from the control units. In FIG. 1 the central electronic control unit 30 is shown as a separate unit. However it is also possible to arrange the central electronic control unit 30 adjacent or in (not shown) the junction box 20.

Figure 2:
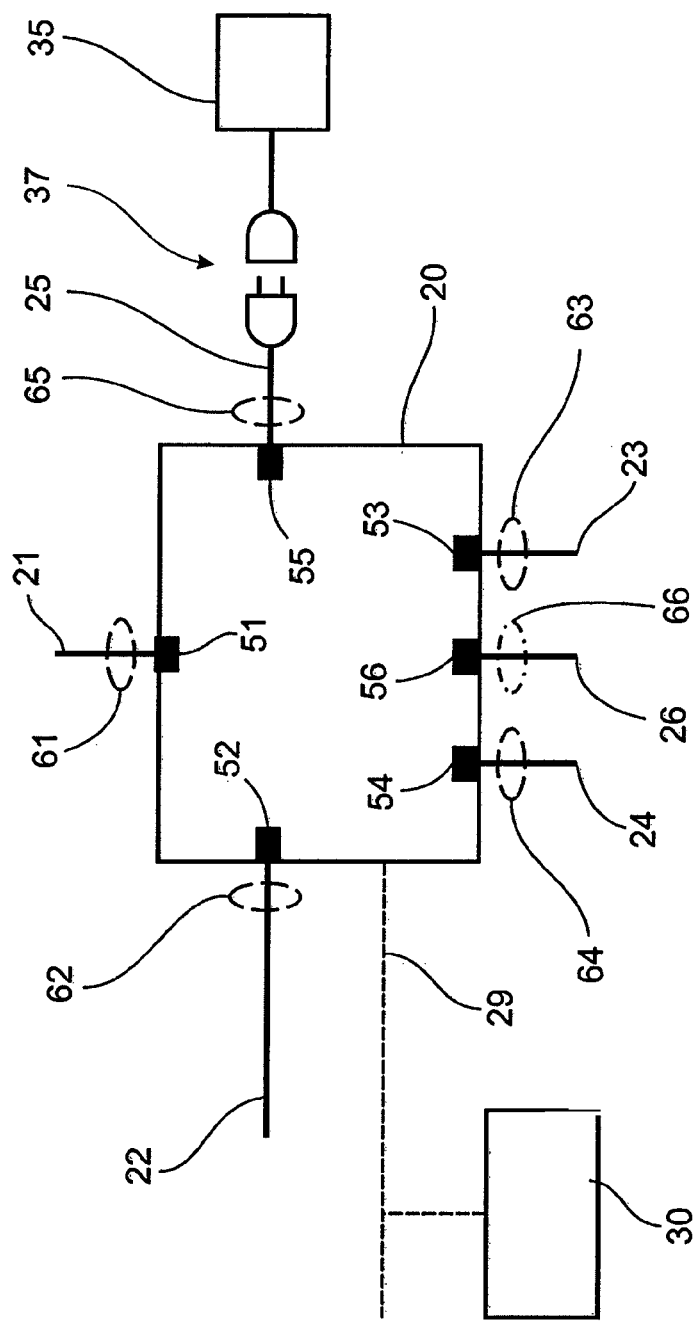
FIG. 2 shows a schematic diagram of a junction box for use in a vehicle as indicated in FIG. 1.

FIG. 2 shows an enlarged schematic junction box 20 according the invention.

The junction box 20 comprises multiple connectors 51, 52, 53, 54, 55 where each connector is provided with a current sensor 61, 62, 63, 64, 65. The current sensors comprise non-contact sensors, such as Hall-effect devices. Sensor signals from the current sensors 61, 62, 63, 64, 65 are transmitted through the wire harness 29 to the central electronic control unit 30. In addition to the connectors 51, 52, 53, 54, 55 and current sensor 61, 62, 63, 64, 65 the junction box 20 can also contain fuses (not shown) for the power buses.

A first sensor 61 is arranged to measure the current through the first DC bus 21, to or from the power electronics converter (PEC) 31. A second sensor 62 is arranged to measure the current through the second DC bus 22, to or from the battery pack 32. A third sensor 63 is arranged to measure the current through the third DC bus 23, to or from the DC/DC converter 33. A fourth sensor 64 is arranged to measure the current through the fourth DC bus 24, to one or more high voltage electrical loads (ePTO) 34. A fifth sensor 65 is arranged to measure the current through the fourth DC bus 25, to a charger 35.

In the traction voltage system shown in FIGS. 1 and 2, the junction box 20 is provided with a current sensor for each connector 51, 52, 53, 54, 55. Alternatively, all but one of the DC buses 21, 22, 23, 24, 25 can be provided with a sensor, whereby the current through the bus lacking a sensor is calculated by the electronic control unit 30.

According to a further alternative the junction box 20 shown in FIG. 2 is provided with connectors 51, 52, 53, 54, 55, which are all provided with sensors 61, 62, 63, 64, 65 for the loads indicated in FIG. 1. An additional sixth connector 56 can be provided in order to allow an additional load (not shown) to be connected to the junction box 20 by a sixth DC bus 66, as indicated in dashed lines. According to the invention, the sixth DC bus 66 connected to the connector 56 may or may not be provided with a current sensor 56, as indicated in dash-dotted lines.

Although only one additional connector is shown, the junction box can be provided with multiple additional connectors in order to allow various components to be added or removed from the junction box in a modular fashion. The number and type of components (energy sources and/or loads) connected to the junction box can be dependent on the current use of the vehicle and/or the need for adaptation of the traction voltage system by a coach builder or similar user. A user need only know the power requirements or power rating for the component to be connected, in order to select an appropriate connector for that component. This ensures that the user does not connect a component that could overload the system. This arrangement allows individual components to be monitored and provides a modular system allowing components to be added, removed or replaced while maintaining control over the current flow in the system.

In operation, the electronic control unit 30 is arranged to determine an instantaneous current value flowing to or from each component connected to the junction box 20 using the input signals from the current sensor 61, 62, 63, 64, 65. The instantaneous current values are compared with a respective predetermined limit value for each connector, which limit value can be a maximum current or a number of current pulses or cyclic current variations detected over a predetermined time. The electronic control unit 30 is arranged to control the respective controller or circuit breaker of the component in question in response to the outcome of the comparison.

According to one example, the electronic control unit 30 is arranged to at least limit the current to or from a component if the instantaneous current through a connector exceeds a predetermined limit for power usage for that connector. For instance, a connector 54 for an electrical load (ePTO) 34 has a predetermined limit for power usage for that connector 54. When a component associated with the electrical load (ePTO) 34 uses too much power, the excess current in the DC bus 24 is detected by the current sensor 64 monitoring the connector 54 for that load 34. The sensor 64 transmits a signal to the electronic control unit 30, which determines that the limit for power usage is being exceeded. The electronic control unit 30 will transmit a signal to a controller or a relay for the load, or to a relay (not shown) in the junction box, causing the supply of power to the component to be either limited or interrupted.

The action taken can be dependent on whether the component is vital for the operation of the vehicle or not. Alternatively, the action taken can be dependent on if the power usage exceeds a first limit, lower than the maximum limit, or a second limit, equal to the maximum limit. In addition, when a component uses too much power, this can be prevented and/or monitored by the electronic control unit 30.

When a first limit is exceeded, the supply of power to the component can be limited but need not be interrupted. At the same time, the electronic control unit 30 can issue a warning to the operator and/or begin logging excessive power usage. Should the second, maximum limit be exceeded, the supply of power to the component is either limited, if the component must continue to function, or interrupted, to prevent damage to the system. At the same time, the electronic control unit 30 can issue a warning to the operator and/or log the excessive power usage event.

This allows the user to check the traction voltage system for components which are malfunctioning or which have been connected to a connector with the wrong power rating for the component. In addition, the logging of the power usage allows a manufacturer or a fleet owner to detect if the electrical has been temporarily or systematically abused.

According to a further example, the electronic control unit 30 is arranged to monitor all loads connected to the system at a central location and issue warnings or log events when irregularities in operation of a component or other unexpected events occur. For instance, if the generator 14 is operated to charge the battery 32 too frequently, then this could lead to overheating of the generator 14 or to battery related problems. In this case the predetermined limit value is the number of detected charging cycles over a set time period. The current variations and the direction of the current in the DC bus 21 are detected by the current sensor 61 monitoring the connector 51 for the PLC 31. The sensor 61 transmits a signal to the electronic control unit 30, which determines that a limit value for the number of charging cycles over a predetermined period of time is being exceeded. The electronic control unit 30 will transmit a signal to the BMU 42, or to a relay (not shown) in the junction box, causing the supply of charging current from the generator 14 to the battery 32 to be either limited or interrupted.

According to a further example, the electronic control unit 30 is arranged to monitor all loads and power sources to ensure that all loads are switched off before a circuit breaker or relay connecting a component 31, 32, 33, 34, 35 to the junction box 20 is opened. This is important in DC systems, where components can be destroyed by arcing or current surges if the current is connected or interrupted incorrectly. It can also be used to ensure that a component or the junction box is disconnected during service or replacement of components.

According to a further example, the electronic control unit 30 is arranged to monitor all loads connected to the junction box 20 and to limit the current to or from a load if the instantaneous current through a connector exceeds a predetermined limit for the load. This example is applicable in cases where the electronic control unit 30 has pre-programmed data for existing components 31, 32, 33, 34, 35 or has received data relating to the power rating from a component 36 subsequently connected to a connector. If the power rating for the component 31, 32, 33, 34, 35, 36 is lower than that of the connector 51, 52, 53, 54, 55, 56, then it may be necessary to limit the current to the component before the maximum allowable power usage for the connector has been reached. This situation can occur if a component is malfunctioning and causes a current surge that would damage the component but does not exceed the rower rating for the connector.

The present invention also relates to a computer program, computer program product and a storage medium for a computer all to be used with a computer for executing the method as described in any one of the above examples.

Figure 3:
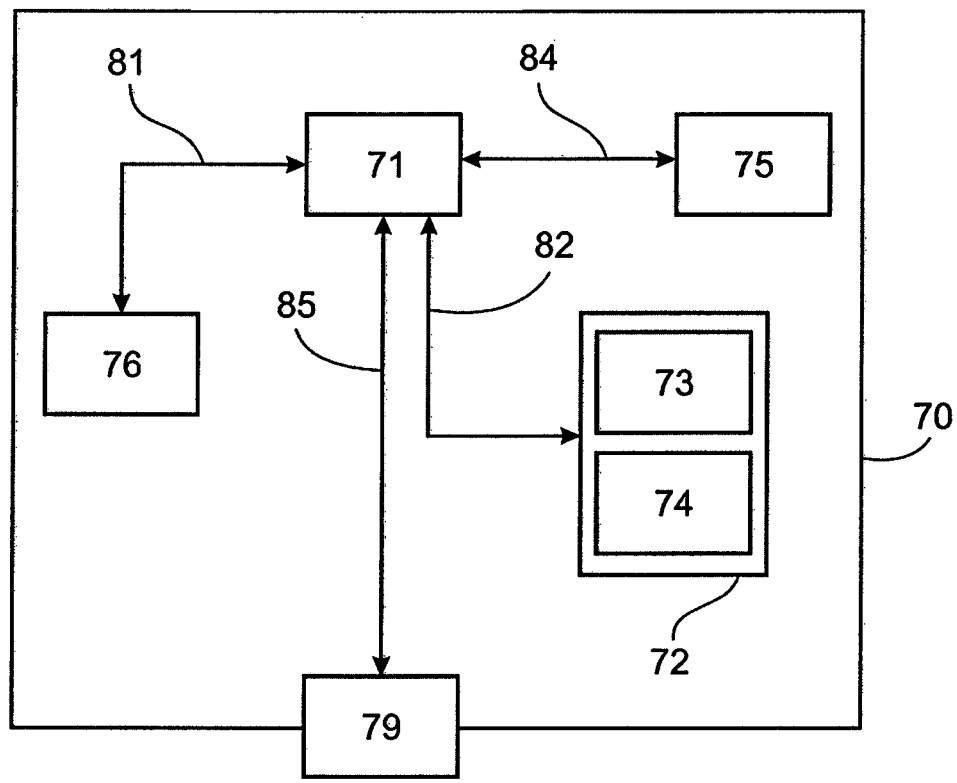
FIG. 3 shows the invention applied on a computer arrangement.

FIG. 3 shows an apparatus 70 according to one embodiment of the invention, comprising a nonvolatile memory 72, a processor 71 and a read and write memory 76. The memory 72 has a first memory part 73, in which a computer program for controlling the apparatus 70 is stored. The computer program in the memory part 73 for controlling the apparatus 70 can be an operating system.

The apparatus 70 can be enclosed in, for example, an electronic control unit, such as the control unit 45. The data-processing unit 71 can comprise, for example, a microcomputer.

The memory 72 also has a second memory part 74, in which a program for controlling the target gear selection function according to the invention is stored. In an alternative embodiment, the program for controlling the transmission is stored in a separate nonvolatile storage medium 75 for data, such as, for example, a CD or an exchangeable semiconductor memory. The program can be stored in an executable form or in a compressed state.

When it is stated below that the data-processing unit 71 runs a specific function, it should be clear that the data-processing unit 71 is running a specific part of the program stored in the memory 74 or a specific part of the program stored in the nonvolatile storage medium 72.

The data-processing unit 71 is tailored for communication with the storage memory 72 through a data bus 84. The data-processing unit 71 is also tailored for communication with the memory 72 through a data bus 82. In addition, the data-processing unit 71 is tailored for communication with the memory 76 through a data bus 81. The data-processing unit 71 is also tailored for communication with a data port 79 by the use of a data bus 85.

The method according to the present invention can be executed by the data-processing unit 71, by the data-processing unit 71 running the program stored in the memory 74 or the program stored in the nonvolatile storage medium 75.

The invention should not be deemed to be limited to the embodiments described above, but rather a number of further variants and modifications are conceivable within the scope of the following patent claims.

The invention claimed is:

1. Traction voltage system in a vehicle, comprising:
   electrical components, the electrical components comprising electrical supply means and electrical loads;
   a junction box comprising connectors for respective ones of the electrical components, the connectors each being provided with a current sensor arranged to transmit a signal representing detected current values to an electronic control unit;
   a traction motor connected to the junction box via a power electronics converter;

at least one of a controller and a circuit breaker for respective ones of the electrical components, the at least one of the controller and the circuit breaker being arranged to control the supply of power to the electrical components; and the electronic control unit, the electronic control unit being arranged to monitor current flowing to or from each one of the electrical components, to determine an instantaneous current value flowing to or from each one of the electrical components, to compare the instantaneous current value flowing to or from each one of the electrical components with at least one predetermined limit value for each connector, the predetermined limit value being at least one of a maximum current value, a maximum rate of change for a current value, or a number of current pulses or cyclic current variations detected over a period of time, and to control the at least one of the controller and the circuit breaker for each of the respective electrical components in response to the comparison, wherein the electronic control unit is arranged to, first, limit the current to or from at least one of the electrical components when the instantaneous current to the at least one of the electrical components through a connector for the at least one of the electrical components exceeds a first predetermined limit for power usage for that connector under current vehicle operating conditions by increasing or decreasing current supplied to at least one other one of the electrical components, and, thereafter, to interrupt the current to or from the at least one of the electrical components when the instantaneous current to the at least one of the electrical components through the connector exceeds a second predetermined limit for power usage for that connector under current vehicle operating conditions.

2. Traction voltage system according to claim 1, wherein the electronic control unit is arranged to at least limit the current to or from an electrical component if a detected number of cyclic current variations detected over a predetermined period of time exceeds a predetermined limit value.

3. Traction voltage system according to claim 1, wherein the electronic control unit is arranged to at least limit the current to or from a power supply component if a rate of change of current variations detected over a predetermined period of time exceeds a predetermined limit value.

4. Traction voltage system according to claim 1, wherein the electronic control unit is arranged to log current values if detected current through a connector exceeds the first predetermined limit for that connector.

5. Traction voltage system according to claim 1, wherein the electronic control unit is arranged to generate a warning signal if the detected current through a connector exceeds the first predetermined limit for that connector.

6. Traction voltage system according to claim 1, wherein the electrical control unit is arranged to interrupt current to or from an electrical component of the electrical components if instantaneous current to the electrical component exceeds a maximum value for power usage for the electrical component.

7. Traction voltage system according to claim 1, wherein the electronic control unit is arranged to determine that an electrical component of the electrical components is switched off before a circuit breaker connecting the electrical component to the junction box is opened.

8. Traction voltage system according to claim 1, wherein the electronic control unit is arranged to determine that each electrical component of the electrical components is switched off before all circuit breakers connecting the electrical components to the junction box are opened.

9. Vehicle provided with a traction voltage system according to claim 1.

10. Traction voltage system according to claim 1, wherein the junction box comprises one or more other connectors for other respective ones of the electrical components, at least one of the one or more other connectors not including a current sensor.

11. Method for monitoring current flow through a junction box in a vehicle traction voltage system in a vehicle, the traction voltage system comprising electrical components, the electrical components comprising electrical supply means and electrical loads, a junction box comprising connectors for respective ones of the electrical components, the connectors each being provided with a current sensor arranged to transmit a signal representing detected current values to the electronic control unit, a traction motor connected to the junction box via a power electronics converter, at least one of a controller and a circuit breaker for respective ones of the electrical components, the at least one of the controller and the circuit breaker being arranged to control the supply of power to the electrical components, and an electronic control unit, comprising monitoring, via signals transmitted to the electronic control unit from current sensors of the connectors, current flowing to or from each one of the electrical components, to determine an instantaneous current value flowing to or from each one of the electrical components, comparing, via the electronic control unit, the instantaneous current value flowing to or from each one of the electrical components with at least one predetermined limit value for each connector, the predetermined limit value being at least one of a maximum current value, a maximum rate of change for a current value, or a number of current pulses or cyclic current variations detected over a period of time, controlling, via the electronic control unit, the at least one of the controller and the circuit breaker for each of the respective electrical components in response to the comparison, first, limiting, via the electronic control unit, the current to or from at least one of the electrical components when the instantaneous current to the at least one of the electrical components through a connector for the at least one of the electrical components exceeds a first predetermined limit for power usage for that connector under current vehicle operating conditions by increasing or decreasing current supplied to at least one other one of the electrical components, and, thereafter, interrupting, via the electronic control unit, the current to or from the at least one of the electrical components when the instantaneous current to the at least one of the electrical components through the connector exceeds a second predetermined limit for power usage for that connector under current vehicle operating conditions.

12. Method according to claim 11, comprising at least limiting the current to or from an electrical component if a number of cyclic current variations detected over a predetermined period of time exceeds a predetermined limit value.

13. Method according to claim 11, comprising at least limiting the current to or from a power supply component if a rate of change of current variations detected over a predetermined period of time exceeds a predetermined limit value.

14. Method according to claim 11, comprising logging current values in excess of the predetermined value if the current through a connector exceeds a first predetermined limit for that connector.

15. Method according to claim 11, comprising issuing a warning if the current through a connector exceeds a first predetermined limit for that connector.

16. Method according to claim 11, wherein the second predetermined limit for power usage is a maximum value for power usage for the at least one component from the second group of components and/or the at least one component from the first group of components.

17. Method according to claim 11, comprising determining that a particular electrical component of the electrical components is switched off before opening a circuit breaker connecting the electrical component to the junction box.

18. Method according to claim 11, comprising determining that all electrical components are switched off before opening all circuit breakers connecting the electrical components to the junction box.

19. A computer comprising a non-transitory computer program for performing all the steps of claim 11 when the program is run on the computer.

20. A non-transitory computer program product comprising program code stored on a non-transitory computer readable medium for performing all steps of claim 11 when the program product is run on a computer.

21. A non-transitory storage medium for use in a computing environment, comprising a computer readable program code to perform the method of claim 11.

* * * * *